United States Patent
Jiang et al.

(10) Patent No.: US 11,400,930 B2
(45) Date of Patent: Aug. 2, 2022

(54) SIMULTANEOUS LANE CHANGE SITUATIONAL AWARENESS

(71) Applicant: GM GLOBAL TECHNOLOGY OPERATIONS LLC, Detroit, MI (US)

(72) Inventors: Meng Jiang, Rochester Hills, MI (US); Jiyu Zhang, Sterling Heights, MI (US); Prakash Mohan Peranandam, Rochester Hills, MI (US); Mohamed A. Layouni, Warren, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 117 days.

(21) Appl. No.: 16/791,066

(22) Filed: Feb. 14, 2020

(65) Prior Publication Data
US 2021/0253095 A1    Aug. 19, 2021

(51) Int. Cl.
*B60W 30/095*   (2012.01)
*B60W 30/18*    (2012.01)
*B60W 30/09*    (2012.01)

(52) U.S. Cl.
CPC ........ *B60W 30/0956* (2013.01); *B60W 30/09* (2013.01); *B60W 30/0953* (2013.01); *B60W 30/18163* (2013.01)

(58) Field of Classification Search
CPC ......... B60W 30/0956; B60W 30/0953; B60W 30/18163; B60W 30/09
See application file for complete search history.

(56) References Cited

U.S. PATENT DOCUMENTS

| | | | |
|---|---|---|---|
| 2017/0305422 A1* | 10/2017 | Ito | B60W 50/14 |
| 2018/0188735 A1* | 7/2018 | Sugawara | B62D 15/0255 |
| 2020/0039510 A1* | 2/2020 | Kume | G08G 1/167 |
| 2020/0361455 A1* | 11/2020 | Murakami | B60W 10/18 |

* cited by examiner

*Primary Examiner* — Abby Y Lin
*Assistant Examiner* — Danielle Marie Jackson
(74) *Attorney, Agent, or Firm* — Cantor Colburn LLP

(57) ABSTRACT

A system and method for predicting a collision between a host vehicle and a target vehicle operating on a multi-lane roadway may include determining the host and target vehicles are converging from respective first and second lanes to a third lane intermediate the first and second lanes. A predetermined set of conditions is evaluated including relationships among the host and target vehicle separations and speeds, and a collision predicted based upon the evaluation.

16 Claims, 4 Drawing Sheets

SIMULTANEOUS LANE CHANGE SITUATIONAL AWARENESS

This disclosure is related to situational awareness in road vehicles.

Vehicle systems are known to monitor the region surrounding the vehicle for improving a driver's situational awareness, for example forward and rear range, range-rate and vision systems. Such systems may be utilized in providing operator warnings or alerts. Such systems may be enablers in autonomous and semi-autonomous vehicle controls, for example adaptive cruise controls, assisted parking, lane keeping and blind spot warnings for adjacent lanes. However, known systems are primarily concerned with adjacent lanes and may overlook potential collisions of vehicles vying for the same position in an intermediate lane.

SUMMARY

In one exemplary embodiment, a method for predicting a collision between a host vehicle and a target vehicle operating on a multi-lane roadway may include determining the host and target vehicles are converging from respective first and second lanes to a third lane intermediate the first and second lanes, evaluating a predetermined set of conditions including relationships between the host and target vehicle separations and speeds, and predicting the collision based upon the evaluating.

In addition to one or more of the features described herein, determining the host and target vehicles are converging may be based upon a predetermined set of relationships between host and target vehicle separations and time.

In addition to one or more of the features described herein, determining the host and target vehicles are converging may include determining a change in a lateral separation between the host and target vehicles over a known time, determining a lateral closing speed between the host and target vehicles based upon the change in the lateral separation and the known time, and determining the host and target vehicles are converging when the lateral closing speed exceeds a known lateral speed of the host vehicle.

In addition to one or more of the features described herein, the relationships between the host and target vehicle separations and speeds may include the inequalities $D_0 - \Delta t (V_{1l} - V_{2l}) < (V_{1l} - V_{2l}) \times R$ and $S_0 + \Delta t (V_{1f} - V_{2f}) < (V_{1f} - V_{2f}) \times R$, wherein $D_0$ is an initial lateral separation between the host and target vehicles, $V_{1l}$ is the host vehicle lateral speed, $V_{2l}$ is the target vehicle lateral speed, $S_0$ is an initial longitudinal separation between the host and target vehicles, $V_{1f}$ is the host vehicle longitudinal speed, $V_{2f}$ is the target vehicle longitudinal speed, $\Delta t$ is a time duration from an initial time to the predicted collision, and R is a predetermined reaction time. A predicted collision is indicated where a $\Delta t$ exists for which both inequalities are satisfied.

In addition to one or more of the features described herein, the predetermined set of conditions may include relationships among the host and target vehicle separations, speeds and geometries.

In addition to one or more of the features described herein, the relationships among the host and target vehicle separations, speeds and geometries may include the inequalities $$D_0 - \Delta t(V_{1l} - V_{2l}) < \frac{(W_1 + W_2)}{2} \times C$$

and $$S_0 + \Delta t(V_{1f} - V_{2f}) < \frac{(L_1 + L_2)}{2} \times C,$$

wherein $D_0$ is an initial lateral separation between the host and target vehicles, $V_{1l}$ is the host vehicle lateral speed, $V_{2l}$ is the target vehicle lateral speed, $W_1$ is a width of the host vehicle, $W_2$ is a width of the target vehicle, $S_0$ is an initial longitudinal separation between the host and target vehicles, $V_{1f}$ is the host vehicle longitudinal speed, $V_{2f}$ is the target vehicle longitudinal speed, $L_1$ is a length of the host vehicle, $L_2$ is a length of the target vehicle, $\Delta t$ is a time duration from an initial time to the collision, and C is a predetermined coefficient. The collision may be indicated where a $\Delta t$ exists for which all inequalities are satisfied.

In addition to one or more of the features described herein, the predetermined set of conditions may include relationships among the host and target vehicle separations, speeds and geometries, and lane geometries.

In addition to one or more of the features described herein, the relationships among the host and target vehicle separations, speeds and geometries, and lane geometries may include the inequalities $$(V_{1l} + V_{2l})\Delta t \geq D_0 - \frac{W_1 \cos\alpha + W_2 \cos\beta}{2},$$

$$(V_{1f} - V_{2f})\Delta t \leq \frac{L_1 \sin\alpha + L_2 \sin\beta}{2} - S_0,$$

$$D_{1L} < V_{1l}\Delta t < D_{1L} + W_L,$$

and $$D_{2L} < V_{2l}\Delta t < D_{2L} + W_L,$$

wherein $D_0$ is an initial lateral separation between the host and target vehicles, $V_{1l}$ is the host vehicle lateral speed, $V_{2l}$ is the target vehicle lateral speed, $W_1$ is a width of the host vehicle, $W_2$ is a width of the target vehicle, $\alpha$ and $\beta$ represent angles between respective vehicle headings and the roadway centerline, $S_0$ is an initial longitudinal separation between the host and target vehicles, $V_{1f}$ is the host vehicle longitudinal speed, $V_{2f}$ is the target vehicle longitudinal speed, $L_1$ is a length of the host vehicle, $L_2$ is a length of the target vehicle, $D_{1L}$ is a longitudinal separation between the host vehicle and the adjacent intermediate lane, $D_{2L}$ is a longitudinal separation between the target vehicle and the adjacent intermediate lane, $W_L$ is lane width, and $\Delta t$ is a time duration from an initial time to the collision. A collision is indicated where a $\Delta t$ exists for which all inequalities are satisfied.

In addition to one or more of the features described herein, determining the host and target vehicles are converging may be based upon at least one of a radar system, a lidar system, an ultrasonic system, a vision system, a global positioning system, a vehicle-to-vehicle communication system, and a vehicle-to-infrastructure communication system.

In another exemplary embodiment, a system for predicting a collision between a host vehicle and a target vehicle operating on a multi-lane roadway may include a host vehicle and a target vehicle and a controller. The controller may be configured to determine the host and target vehicles are converging from respective first and second lanes to a third lane intermediate the first and second lanes, evaluate a predetermined set of conditions comprising relationships between the host and target vehicle separations and speeds, and indicate the collision based upon the evaluation.

In addition to one or more of the features described herein, the controller may determine the host and target vehicles are converging based upon a predetermined set of relationships between host and target vehicle separations and time.

In addition to one or more of the features described herein, the controller may be configured to determine a change in a lateral separation between the host and target vehicles over a known time, determine a lateral closing speed between the host and target vehicles based upon the change in the lateral separation and the known time, and determine the host and target vehicles are converging when the lateral closing speed exceeds a known lateral speed of the host vehicle.

In addition to one or more of the features described herein, the relationships between the host and target vehicle separations and speeds may include the inequalities $D_0-\Delta t(V_{1l}-V_{2l})<(V_{1l}-V_{2l})\times R$ and $S_0+\Delta t(V_{1f}-V_{2f})<(V_{1f}-V_{2f})\times R$, wherein $D_0$ is an initial lateral separation between the host and target vehicles, $V_{1l}$ is the host vehicle lateral speed, $V_{2l}$ is the target vehicle lateral speed, $S_0$ is an initial longitudinal separation between the host and target vehicles, $V_{1f}$ is the host vehicle longitudinal speed, $V_{2f}$ is the target vehicle longitudinal speed, $\Delta t$ is a time duration from an initial time to the predicted collision, and R is a predetermined reaction time. A predicted collision is indicated where a $\Delta t$ exists for which both inequalities are satisfied.

In addition to one or more of the features described herein, the predetermined set of conditions may include relationships among the host and target vehicle separations, speeds and geometries.

In addition to one or more of the features described herein, the relationships among the host and target vehicle separations, speeds and geometries may include the inequalities $$D_0 - \Delta t(V_{1l} - V_{2l}) < \frac{(W_1 + W_2)}{2} \times C$$

and $$S_0 + \Delta t(V_{1f} - V_{2f}) < \frac{(L_1 + L_2)}{2} \times C,$$

wherein $D_0$ is an initial lateral separation between the host and target vehicles, $V_{1l}$ is the host vehicle lateral speed, $V_{2l}$ is the target vehicle lateral speed, $W_1$ is a width of the host vehicle, $W_2$ is a width of the target vehicle, $S_0$ is an initial longitudinal separation between the host and target vehicles, $V_{1f}$ is the host vehicle longitudinal speed, $V_{2f}$ is the target vehicle longitudinal speed, $L_1$ is a length of the host vehicle, $L_2$ is a length of the target vehicle, $\Delta t$ is a time duration from an initial time to the collision, and C is a predetermined coefficient. The collision may be indicated where a $\Delta t$ exists for which all inequalities are satisfied.

In addition to one or more of the features described herein, the predetermined set of conditions may include relationships among the host and target vehicle separations, speeds and geometries, and lane geometries.

In addition to one or more of the features described herein, the relationships among the host and target vehicle separations, speeds and geometries, and lane geometries may include the inequalities $$(V_{1l} + V_{2l})\Delta t \geq D_0 - \frac{W_1\cos\alpha + W_2\cos\beta}{2},$$

$$(V_{1f} - V_{2f})\Delta t \leq \frac{L_1\sin\alpha + L_2\sin\beta}{2} - S_0,$$

$$D_{1L} < V_{1l}\Delta t < D_{1L} + W_L,$$

and $$D_{2L} < V_{2l}\Delta t < D_{2L} + W_L,$$

wherein $D_0$ is an initial lateral separation between the host and target vehicles, $V_{1l}$ is the host vehicle lateral speed, $V_{2l}$ is the target vehicle lateral speed, $W_1$ is a width of the host vehicle, $W_2$ is a width of the target vehicle, $\alpha$ and $\beta$ represent angles between respective vehicle headings and the roadway centerline, $S_0$ is an initial longitudinal separation between the host and target vehicles, $V_{1f}$ is the host vehicle longitudinal speed, $V_{2f}$ is the target vehicle longitudinal speed, $L_1$ is a length of the host vehicle, $L_2$ is a length of the target vehicle, $D_{1L}$ is a longitudinal separation between the host vehicle and the adjacent intermediate lane, $D_{2L}$ is a longitudinal separation between the target vehicle and the adjacent intermediate lane, $W_L$ is lane width, and $\Delta t$ is a time duration from an initial time to the collision. A collision is indicated where a $\Delta t$ exists for which all inequalities are satisfied.

In addition to one or more of the features described herein, the system may include at least one of a radar system, a lidar system, an ultrasonic system, a vision system, a global positioning system, a vehicle-to-vehicle communication system, and a vehicle-to-infrastructure communication system providing at least one of target vehicle position data, range data and rate data. The controller may be configured to determine the host and target vehicles are converging based upon at least one of the target vehicle position data, range data and rate data.

In yet another exemplary embodiment, a method for predicting a collision between a host vehicle and a target vehicle operating on a multi-lane roadway may include determining the host and target vehicles are converging from respective first and second lanes to a third lane intermediate the first and second lanes. The convergence determination may include determining a change in a lateral separation between the host and target vehicles over a known time, determining a lateral closing speed between the host and target vehicles based upon the change in the lateral separation and the known time, and determining the host and target vehicles are converging when the lateral closing speed exceeds a known lateral speed of the host vehicle. The method may further include evaluating a predetermined set of inequalities including host and target vehicle separations and speeds, and predicting the collision based upon the evaluating.

In addition to one or more of the features described herein, the predetermined set of inequalities may include the inequalities $D_0-\Delta t(V_{1l}-V_{2l})<(V_{1l}-V_{2l})\times R$ and $S_0+\Delta t(V_{1f}-V_{2f})<(V_{1f}-V_{2f})\times R$, wherein $D_0$ is an initial lateral separation between the host and target vehicles, $V_{1l}$ is the host vehicle lateral speed, $V_{2l}$ is the target vehicle lateral speed, $S_0$ is an initial longitudinal separation between the host and target vehicles, $V_{1f}$ is the host vehicle longitudinal speed, $V_{2f}$ is the target vehicle longitudinal speed, $\Delta t$ is a time duration from an initial time to the predicted collision, and R is a predetermined reaction time. A predicted collision is indicated where a $\Delta t$ exists for which both inequalities are satisfied.

The above features and advantages, and other features and advantages of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

Figure 1:
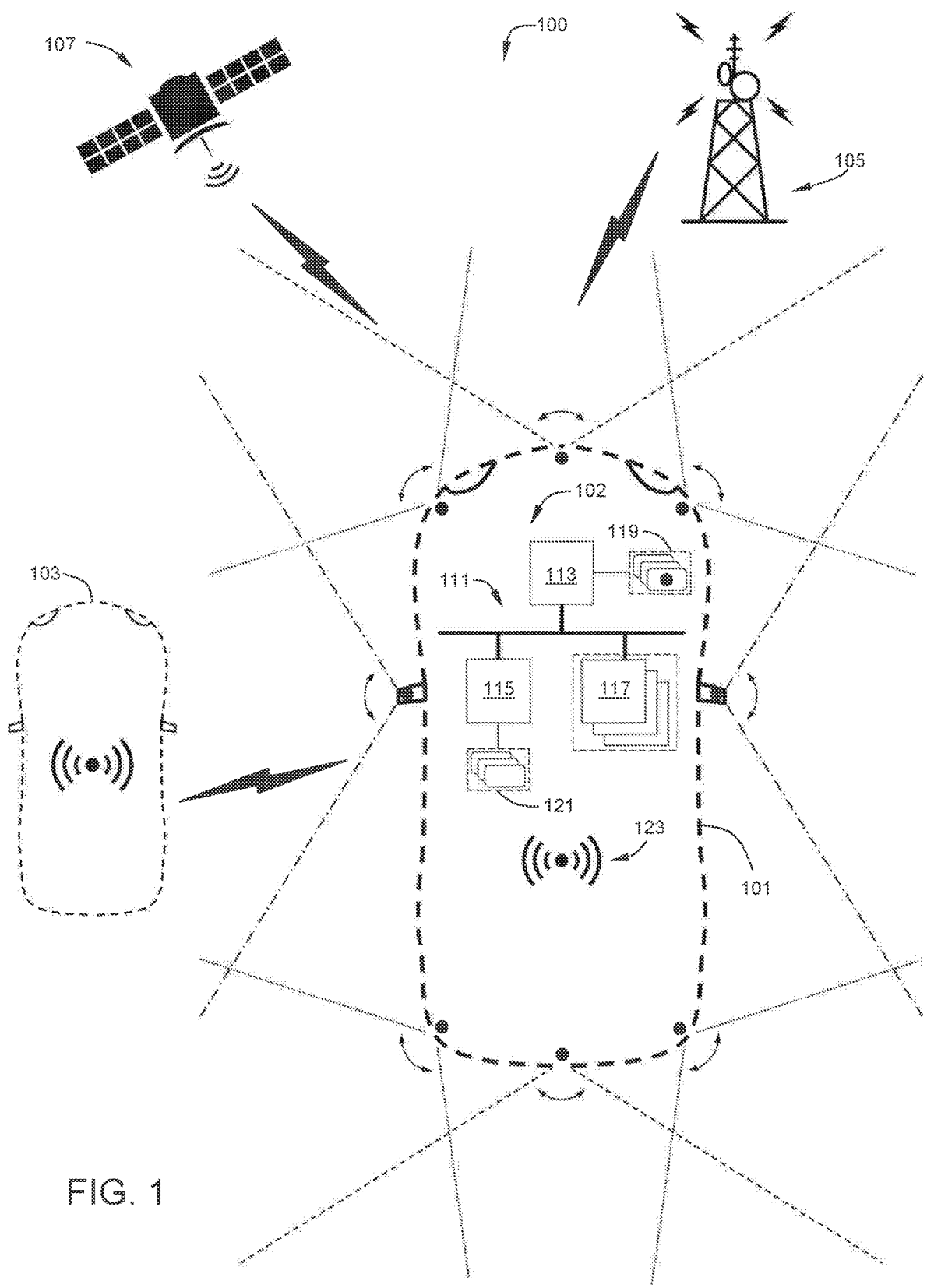
FIG. 1 illustrates an exemplary system for simultaneous lane change situational awareness, in accordance with the present disclosure.

The following description is merely exemplary in nature and is not intended to limit the present disclosure, its application or uses. Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

During roadway operation of a vehicle by a vehicle operator, semi-autonomously or fully-autonomously, the vehicle may be an observer in a driving scene which includes a driving environment including, for example the roadway, surrounding infrastructure, objects, signs, hazards and other vehicles sharing the roadway. An observing vehicle may be referred to herein as a host vehicle. Other vehicles sharing the roadway may be referred to herein as target vehicles.

A host vehicle may be equipped with various sensors and communication hardware and systems. An exemplary host vehicle 101 is shown in FIG. 1 which illustrates an exemplary system 100 for simultaneous lane change situational awareness, in accordance with the present disclosure. Host vehicle 101 may include a control system 102 including a plurality of networked electronic control units (ECUs) which may be communicatively coupled via a bus structure 111 to perform control functions and information sharing, including executing control routines locally or in distributed fashion. Bus structure 111 may be a part of a Controller Area Network (CAN), or other similar network, as is well known to those having ordinary skill in the art. One exemplary ECU may include an engine control module (ECM) 115 primarily performing functions related to internal combustion engine monitoring, control and diagnostics based upon a plurality of inputs 121. While inputs 121 are illustrated as coupled directly to ECM 115, the inputs may be provided to or determined within ECM 115 from a variety of well-known sensors, calculations, derivations, synthesis, other ECUs and sensors over the bus structure 111 as well understood by those having ordinary skill in the art. One having ordinary skill in the art recognizes that a plurality of other ECUs 117 may be part of the network of controllers onboard the host vehicle 101 and may perform other functions related to various other vehicle systems (e.g. chassis, steering, braking, transmission, communications, infotainment, etc.). A variety of vehicle related information may be commonly available and accessible to all networked ECUs, for example, vehicle dynamics information such as speed, heading, steering angle, multi-axis accelerations, yaw, pitch, roll, etc. Another exemplary ECU may include an external object calculation module (EOCM) 113 primarily performing functions related to sensing the environment external to the vehicle 101 and, more particularly, related to roadway lane, pavement and object sensing. EOCM 113 receives information from a variety of sensors 119 and other sources. By way of example only and not of limitation, EOCM 113 may receive information from one or more radar system, lidar system, ultrasonic system, vision system, global positioning system, vehicle-to-vehicle communication system, and vehicle-to-infrastructure communication systems, as well as from on or off board databases, for example map and infrastructure databases. EOCM 113 may therefore have access to position data, range data, rate data, and image based data which may be useful in the determination of roadway and target vehicle information, for example, roadway feature and target vehicle geometric, distance and velocity information, among others. Sensors 119 may be positioned at various perimeter points around the vehicle including front, rear, corners, sides etc. as shown in the vehicle 101 by large dots at those positions. Sensor 119 positioning may be selected as appropriate for providing the desired coverage for particular applications. For example, side and corner positioning of sensors 119 may be more preferred with respect to simultaneous lane change situational awareness, in accordance with the present disclosure. While sensors 119 are illustrated as coupled directly to EOCM 113, the inputs may be provided to EOCM 113 over the bus structure 111 as well understood by those having ordinary skill in the art. Host vehicle 101 may be equipped with radio communication capabilities shown generally at 123 and more particularly related to GPS satellite 107 communications, vehicle-to-vehicle (V2V) communications such as with target vehicles 103, and vehicle-to-infrastructure (V2I) communications such as with terrestrial radio towers 105. The description herein of the exemplary system 100 for simultaneous lane change situational awareness is not intended to be exhaustive. Nor is the description of the various exemplary systems to be interpreted as being wholly required. Thus, one having ordinary skill in the art will understand that some, all and additional technologies from the described exemplary system 100 may be used in various implementations of simultaneous lane change situational awareness in accordance with the present disclosure.

Figure 2:
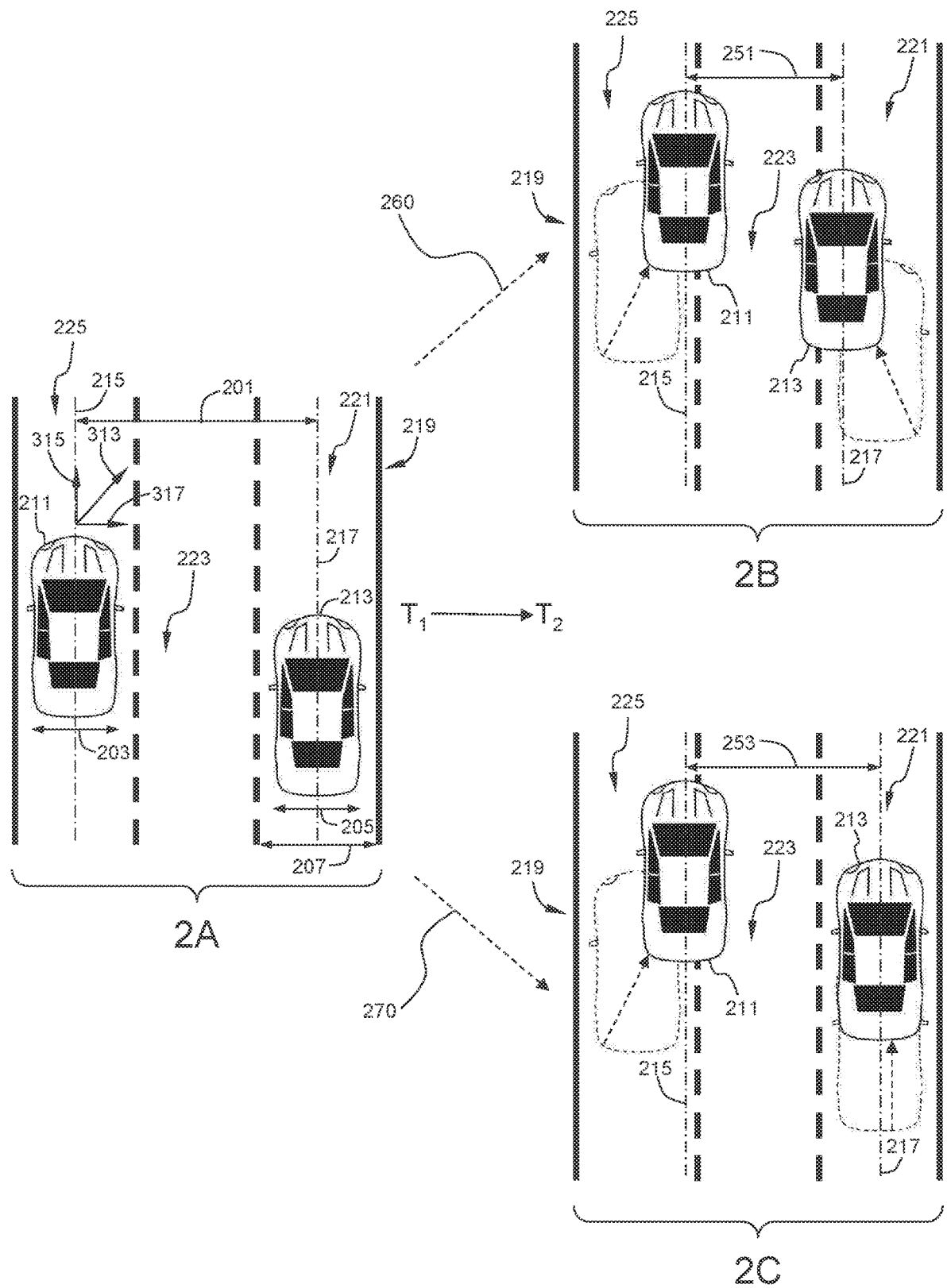
FIG. 2 shows exemplary time shifted vehicle operating scenes illustrating exemplary single and simultaneous lane change scenarios, in accordance with the present disclosure.

With reference to FIG. 2, in one embodiment a host vehicle 211 and a target vehicle 213 are illustrated in time shifted vehicle operating scenes illustrating exemplary single and simultaneous lane change scenarios, in accordance with the present disclosure. With reference to an initial scene labeled 2A at a time $T_1$, an exemplary multi-lane roadway 219 may include a first lane 225, a second lane 221 and an intermediate third lane 223. Each lane has a respective width 207, host vehicle 211 has a width $W_1$ 203 and target vehicle 213 has a width $W_2$ 205. The host vehicle 211 may be traveling in the first lane 225 and the target vehicle may be travelling in the second lane 221. Host and target vehicles 211, 213 are initially laterally separated at time $T_1$ by distance $D_1$ 201. Distance $D_1$ is illustrated relative to longitudinal centerlines 215, 217; however, lateral separation of the vehicles may be relative to any chosen datum including, for example, extreme vehicle width references.

In one embodiment, host and target vehicle 211, 213 convergence upon the common intermediate lane 223 may be determined simply based upon detected separation changes between the vehicles over time. In this regard, lateral vehicle separation may be determined by any suitable source of direct or synthesized range data from the various sensing systems employed on host vehicle 211 or combinationally and cooperatively with shared information between host vehicle 211 and target vehicle 213, for example respective vehicle GPS positional data. In one embodiment, relative lateral distance may be calculated using a sequence of images captured using a depth camera that has X,Y,Z coordinates in terms of image pixels. Therefore, at an initial time $T_1$ the distance $D_1$ is determined and at a future time $T_2$ a second lateral separation $D_2$ is determined. Initial distance determinations may be triggered by an event, for example an operator's intent as determined by a turn signal activation, steering input or vision system sensing lateral vehicle motion or drift relative to the current and adjacent lanes.

Two exemplary mutually exclusive scenarios labeled 2B and 2C correspond to time $T_2$ and the progression of the travelling host and target vehicles 211, 213. In scenario 2B it is assumed that both vehicles have moved toward the intermediate lane 223 since time $T_1$ and the distance $D_2$ 251 represents the lateral separation between the host and target vehicle 211, 213 in scenario 2B wherein there is a simultaneous lane change. In scenario 2C it is assumed that only the host vehicle 211 has moved toward the intermediate lane 223 since time $T_1$ and the target vehicle 213 has substantially maintained its lateral position within lane 221 since time $T_1$. The distance $D_2$ 253 represents the lateral separation between the host and target vehicles 211, 213 in scenario 2C wherein there is no simultaneous lane change.

The change in separation between the host and target vehicles 211, 213 may provide the basis for determining the relative lateral speed between the host and target vehicles 211, 213 in accordance with the following relationships:

$$\Delta D = D_2 - D_1, \quad [1]$$

$$\Delta t = T_1 - T_2, \quad [2]$$

and $$\Delta V = \frac{\Delta D}{\Delta t} \quad [3]$$

wherein $\Delta V$ is the relative lateral speed between the host and target vehicles.

Host vehicle 211 may provide its lateral speed $V_{1l}$ from vehicle dynamics information or GPS information, for example. A comparison of the relative lateral speed $\Delta V$ to the host vehicle lateral speed $V_{1l}$ may be made to determine whether the host and target vehicles 211, 213 are simultaneously converging toward the intermediate lane. Where the relative lateral speed $\Delta V$ is greater than the host vehicle lateral speed $V_{1l}$, then it is determined that both vehicles are simultaneously moving toward the intermediate lane. This is the scenario of progression 260 from scene 2A to 2B of FIG. 2. Where the relative lateral speed $\Delta V$ is not greater than the host vehicle lateral speed $V_{1l}$, then it is determined that only the host vehicle is moving toward the intermediate lane. This is the scenario of progression 270 from scene 2A to 2C of FIG. 2.

Figure 3:
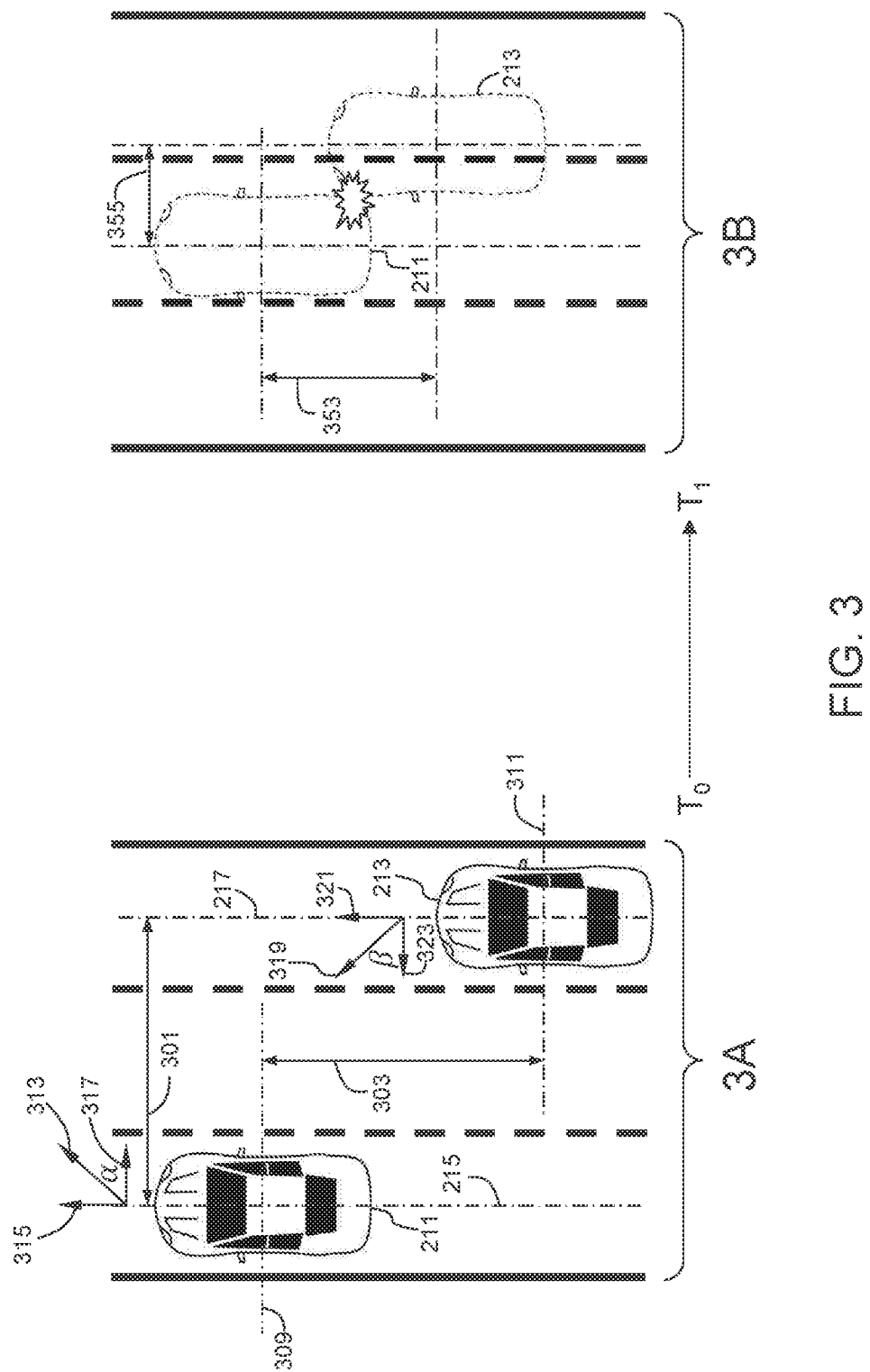
FIG. 3 shows exemplary time shifted vehicle operating scenes illustrating a collision scenario during a simultaneous lane change, in accordance with the present disclosure.

Having thus determined that the host vehicle 211 and the target vehicle 213 are both converging toward the intermediate lane, a collision evaluation may be performed. Based upon the results of the evaluation, operator or system control notifications may be made. Reference is made to FIG. 3 an initial scene labeled 3A corresponding to an initial time $T_0$ which may correspond substantially to the time a collision evaluation is initiated. In one embodiment, this time $T_0$ substantially corresponds in time to the previously described determination that both vehicles are simultaneously moving toward the intermediate lane. In FIG. 3, the host vehicle is labeled 211 and the target vehicle is labeled 213. Host and target vehicles 211, 213 are initially laterally separated at time $T_0$ by distance $D_0$ 301. Distance $D_0$ is illustrated relative to longitudinal centerlines 215, 217. Likewise, the host and target vehicles 211, 213 are initially longitudinally separated at time $T_0$ by distance $S_0$ 303. Distance $S_0$ is illustrated relative to transverse centerlines 309, 311. As with the lateral separation, the longitudinal separation of the vehicles may be relative to any chosen datum including, for example, extreme vehicle length references. Actual host vehicle heading may be represented by vector $V_1$ 313, which may further be represented by lateral component vector $V_{1l}$ 317 at angle α to vector $V_1$ 313 and longitudinal component vector $V_{1f}$ 315. Actual target vehicle heading may be represented by vector $V_2$ 319, which may further be represented by lateral component vector $V_{2l}$ 323 at angle β to vector $V_2$ 319 and longitudinal component vector $V_{2f}$ 321. A subsequent scene is labeled 3B corresponding to a subsequent time $T_1$ which may correspond substantially to some arbitrary future time at which conditions for a collision may be determined to be satisfied given the initial conditions at time $T_0$.

In accordance with one embodiment, a collision evaluation may be performed based upon as set of conditions which rely upon host and target vehicles 211, 213 separation and speeds in accordance with the following inequalities:

$$D_0 - \Delta t(V_{1f} - V_{2l}) < (V_{1f} - V_{2l}) \times R, \text{ and} \quad [4]$$

$$S_0 + \Delta t(V_{1f} - V_{2f}) < (V_{1f} - V_{2f}) \times R \quad [5]$$

wherein $D_0$ is the initial lateral separation between the host and target vehicles, $V_{1l}$ is the host vehicle lateral speed,
$V_{2l}$ is the target vehicle lateral speed,
$S_0$ is the initial longitudinal separation between the host and target vehicles,
$V_{1f}$ is the host vehicle longitudinal speed,
$V_{2f}$ is the target vehicle longitudinal speed,
$\Delta t$ is the time duration from an initial time to a predicted collision, and
R is a predetermined reaction time.

A collision is predicted where a $\Delta t$ exists for which both inequalities are satisfied.

In accordance with another embodiment, a collision evaluation may be performed based upon as set of conditions which rely upon host and target vehicles 211, 213 separation, speeds and geometries in accordance with the following inequalities:

$$D_0 - \Delta t(V_{1l} - V_{2l}) < \frac{(W_1 + W_2)}{2} \times C, \quad [6]$$

and $$S_0 + \Delta t(V_{1f} - V_{2f}) < \frac{(L_1 + L_2)}{2} \times C \quad [7]$$

wherein $D_0$ is the initial lateral separation between the host and target vehicles, $V_{1l}$ is the host vehicle lateral speed,
$V_{2l}$ is the target vehicle lateral speed,
$W_1$ is the width of the host vehicle,
$W_2$ is the width of the target vehicle,
$S_0$ is the initial longitudinal separation between the host and target vehicles,
$V_{1f}$ is the host vehicle longitudinal speed,
$V_{2f}$ is the target vehicle longitudinal speed,
$L_1$ is the length of the host vehicle,
$L_2$ is the length of the target vehicle,
$\Delta t$ is the time duration from an initial time to a predicted collision, and
C is a predetermined coefficient determining a minimum margin distance.

A collision is predicted where a $\Delta t$ exists for which both inequalities are satisfied.

In accordance with another embodiment, a collision evaluation may be performed based upon as set of conditions which rely upon host and target vehicles 211, 213 separations, speeds and geometries, and lane geometries in accordance with the following inequalities:

$$(V_{1l} + V_{2l})\Delta t \geq D_0 - \frac{W_1 \cos\alpha + W_2 \cos\beta}{2}, \quad [8]$$

$$(V_{1f} - V_{2f})\Delta t \leq \frac{L_1 \sin\alpha + L_2 \sin\beta}{2} - S_0, \quad [9]$$

$$D_{1L} < V_{1l}\Delta t < D_{1L} + W_L, \quad [10]$$

and $$D_{2L} < V_{2l}\Delta t < D_{2L} + W_L \quad [11]$$

wherein $D_0$ is the initial lateral separation between the host and target vehicles, $V_{1l}$ is the host vehicle lateral speed,
$V_{2l}$ is the target vehicle lateral speed,
$W_1$ is the width of the host vehicle,
$W_2$ is the width of the target vehicle,
$\alpha$ and $\beta$ represent angles between respective vehicle headings and the roadway centerline,
$S_0$ is the initial longitudinal separation between the host and target vehicles,
$V_{1f}$ is the host vehicle longitudinal speed,
$V_{2f}$ is the target vehicle longitudinal speed,
$L_1$ is the length of the host vehicle,
$L_2$ is the length of the target vehicle,
$D_{1L}$ is the longitudinal separation between the host vehicle and the adjacent intermediate lane,
$D_{2L}$ is the longitudinal separation between the target vehicle and the adjacent intermediate lane,
$W_L$ is lane width, and
$\Delta t$ is the time duration from an initial time to a predicted collision.

A collision is predicted where a $\Delta t$ exists for which all inequalities are satisfied.

Various parameters set forth in the relationships and inequalities [1]-[11] above may be provided by the various sensors and systems described herein, from the network of controllers, from communicated information (e.g. GPS, V2V, V2I) and vehicle setting or calibrations. Other parameters may be inferred, determined, calculated or otherwise synthesized from such provided information.

In any of the embodiments set forth herein above wherein all respective inequalities are satisfied by some $\Delta t$, it is to be recognized that not all predicted collisions may require an operator or control system notification. For example, it may be assumed that a $\Delta t$ in excess of some predetermined threshold time may be well within a reaction threshold of a vehicle operator or autonomous controller and thus not requiring notification or control intervention.

Figure 4:
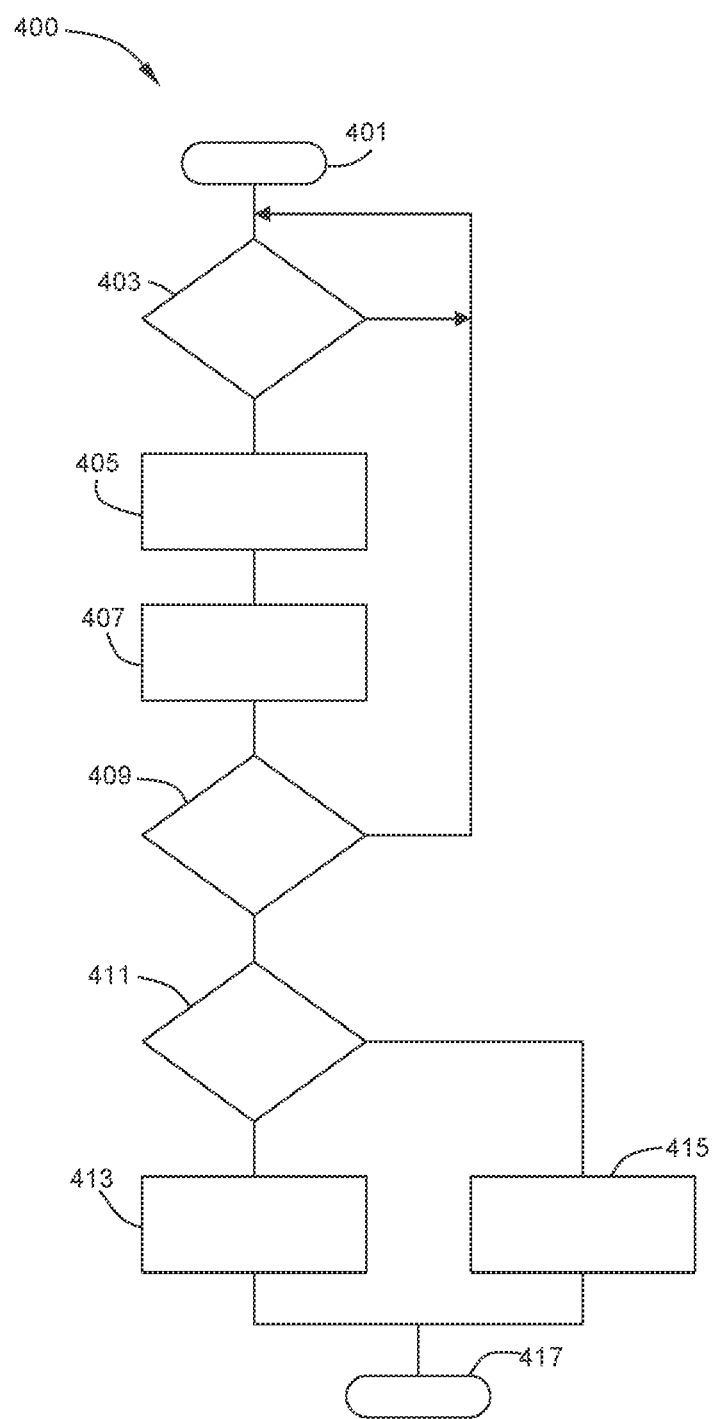
FIG. 4 illustrates an exemplary flowchart of a method for predicting a collision between a host vehicle and a target vehicle operating on a multi-lane roadway, in accordance with the present disclosure.

FIG. 4 illustrates an exemplary flowchart 400 of a method for predicting a collision between a host vehicle and a target vehicle operating on a multi-lane roadway, in accordance with the present disclosure. Flowchart 400 may generally represent steps in a routine implemented within one or more controllers as described herein. The routine begins at 401 and proceeds to 403 whereat a determination is made whether entry conditions are met. For example, host vehicle intent to change lane of travel may be determined or inferred, for example from user turn signal or steering wheel input, vision system input, autonomous or semi-autonomous control inputs, or other suitable means. If entry conditions are not met, then the routine may wait for an indication of such intent. Where the entry conditions are met, the routine proceeds to 405 whereat various parameters useful in the collision prediction routine are received into the routine, for example a sequence of image based XYZ positions of the target vehicle, various sensed, communicated and calibration information set forth in the relationships and inequalities [1]-[11] described herein. At 407, the routine calculates relative lateral speed, for example as set forth in relationship [3] from the lateral separations, $D_1$ and $D_2$, between the host and target vehicles corresponding to the times, $T_1$ and $T_2$, as set forth in relationships [1] and [2] herein, respectively. Alternative lateral separation determinations may be made with image based calculations. At 409, the host vehicle lateral speed, $V_{1l}$, may be compared with the relative lateral speed $\Delta V$. Where the relative lateral speed $\Delta V$ is not greater than the host vehicle lateral speed $V_{1l}$, then it is determined that only the host vehicle is moving toward the intermediate lane and the routine returns to 403 to again wait for an indication of lane change intent. However, where the relative lateral speed $\Delta V$ is greater than the host vehicle lateral speed $V_{1l}$, then it is determined that both vehicles are simultaneously moving toward the intermediate lane and the routine continues at 411. At 411, evaluation of conditions is performed for the purpose of predicting a collision and to determine whether any operator or system control notifications may be made. 411 encompasses, for example, one or more of the various groupings of inequalities [4] and [5], [6] and [7], or [8] through [11] as set forth and described herein. One having ordinary skill in the art may recognize other relationship which may be implemented for the purpose of determining whether host and target vehicles are likely to collide in an intermediate lane during a simultaneous lane change. A predicted collision may result in an operator or system control notification at 413, whereas no predicted collision may result in no such operator or system control notification at 415. The routine may then exit at 417.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for predicting a collision between a host vehicle and a target vehicle operating on a multi-lane roadway, comprising:
    determining the host and target vehicles are converging from respective first and second lanes to a third lane intermediate the first and second lanes based upon a predetermined set of relationships between host and target vehicle separations and time, comprising:
        determining a change in a lateral separation between the host and target vehicles over a known time;
        determining a lateral closing speed between the host and target vehicles based upon the change in the lateral separation and the known time; and
        determining the host and target vehicles are converging when the lateral closing speed exceeds a known lateral speed of the host vehicle;
    evaluating a predetermined set of conditions comprising relationships between the host and target vehicle separations and speeds;
    predicting the collision based upon the evaluating;
    notifying a control system of the predicted collision; and
    controlling intervention of one or more of chassis, steering, braking, or transmission systems functions with the control system.

2. The method of claim 1, wherein the relationships between the host and target vehicle separations and speeds comprise the following inequalities:

$$D_0 - \Delta t(V_{1l} - V_{2l}) < (V_{1l} - V_{2l}) \times R, \text{ and}$$

$$S_0 + \Delta t(V_{1f} - V_{2f}) < (V_{1f} - V_{2f}) \times R,$$

wherein $D_0$ is an initial lateral separation between the host and target vehicles,
    $V_{1l}$ is the host vehicle lateral speed,
    $V_{2l}$ is the target vehicle lateral speed,
    $S_0$ is the initial longitudinal separation between the host and target vehicles,
    $V_{1f}$ is the host vehicle longitudinal speed,
    $V_{2f}$ is the target vehicle longitudinal speed,
    $\Delta t$ is the time duration from an initial time to the predicted collision,
    R is a predetermined reaction time; and
wherein the predicted collision is indicated where a $\Delta t$ exists for which both inequalities are satisfied.

3. The method of claim 1, wherein the predetermined set of conditions comprises relationships among the host and target vehicle separations, speeds and geometries.

4. The method of claim 3, wherein the relationships among the host and target vehicle separations, speeds and geometries comprise the following inequalities:

$$D_0 - \Delta t(V_{1l} - V_{2l}) < \frac{(W_1 + W_2)}{2} \times C,$$

and $$S_0 + \Delta t(V_{1f} - V_{2f}) < \frac{(L_1 + L_2)}{2} \times C,$$

wherein $D_0$ is an initial lateral separation between the host and target vehicles,
    $V_{1l}$ is the host vehicle lateral speed,
    $V_{2l}$ is the target vehicle lateral speed,
    $W_1$ is a width of the host vehicle,
    $W_2$ is a width of the target vehicle,
    $S_0$ is an initial longitudinal separation between the host and target vehicles,
    $V_{1f}$ is the host vehicle longitudinal speed,
    $V_{2f}$ is the target vehicle longitudinal speed,
    $L_1$ is a length of the host vehicle,
    $L_2$ is a length of the target vehicle,
    $\Delta t$ is a time duration from an initial time to the collision,
    C is a predetermined coefficient determining a minimum margin distance; and
wherein the collision is indicated where a $\Delta t$ exists for which both inequalities are satisfied.

5. The method of claim 1, wherein the predetermined set of conditions comprises relationships among the host and target vehicle separations, speeds and geometries, and lane geometries.

6. The method of claim 5, wherein the relationships among the host and target vehicle separations, speeds and geometries, and lane geometries comprise the following inequalities:

$$(V_{1l} + V_{2l})\Delta t \geq D_0 - \frac{W_1\cos\alpha + W_2\cos\beta}{2},$$

$$(V_{1f} - V_{2f})\Delta t \leq \frac{L_1\sin\alpha + L_2\sin\beta}{2} - S_0,$$

$$D_{1L} < V_{1l}\Delta t < D_{1L} + W_L,$$

and $$D_{2L} < V_{2l}\Delta t < D_{2L} + W_L,$$

wherein $D_0$ is an initial lateral separation between the host and target vehicles,
$V_{1l}$ is the host vehicle lateral speed,
$V_{2l}$ is the target vehicle lateral speed,
$W_1$ is a width of the host vehicle,
$W_2$ is a width of the target vehicle,
α and β represent angles between respective vehicle headings and the roadway centerline,
$S_0$ is an initial longitudinal separation between the host and target vehicles,
$V_{1f}$ is the host vehicle longitudinal speed,
$V_{2f}$ is the target vehicle longitudinal speed,
$L_1$ is a length of the host vehicle,
$L_2$ is a length of the target vehicle,
$D_{1L}$ is a longitudinal separation between the host vehicle and the adjacent intermediate lane,
$D_{2L}$ is a longitudinal separation between the target vehicle and the adjacent intermediate lane,
$W_L$ is lane width,
$\Delta t$ is a time duration from an initial time to the collision; and
wherein a collision is indicated where a $\Delta t$ exists for which all inequalities are satisfied.

7. The method of claim 1, wherein determining the host and target vehicles are converging is based upon at least one of a radar system, a lidar system, an ultrasonic system, a vision system, a global positioning system, a vehicle-to-vehicle communication system, and a vehicle-to-infrastructure communication system.

8. A system for predicting a collision between a host vehicle and a target vehicle operating on a multi-lane roadway, comprising:
a host vehicle and a target vehicle; and
a controller configured to:
determine the host and target vehicles are converging from respective first and second lanes to a third lane intermediate the first and second lanes based upon a predetermined set of relationships between host and target vehicle separations and time, comprising:
determining a change in a lateral separation between the host and target vehicles over a known time;
determining a lateral closing speed between the host and target vehicles based upon the change in the lateral separation and the known time; and
determining the host and target vehicles are converging when the lateral closing speed exceeds a known lateral speed of the host vehicle;

evaluate a predetermined set of conditions comprising relationships between the host and target vehicle separations and speeds;
indicate the collision based upon the evaluation;
notify a control system of the indicated collision; and
control intervention of one or more of chassis, steering, braking, or transmission systems functions with the control system.

9. The system of claim 8, wherein the relationships between the host and target vehicle separations and speeds comprise the following inequalities:

$$D_0-\Delta t(V_{1l}-V_{2l})<(V_{1l}-V_{2l})\times R, \text{ and}$$

$$S_0+\Delta t(V_{1f}-V_{2f})<(V_{1f}-V_{2f})\times R,$$

wherein $D_0$ is an initial lateral separation between the host and target vehicles,
$V_{1l}$ is the host vehicle lateral speed,
$V_{2l}$ is the target vehicle lateral speed,
$S_0$ is an initial longitudinal separation between the host and target vehicles,
$V_{1f}$ is the host vehicle longitudinal speed,
$V_{2f}$ is the target vehicle longitudinal speed,
$\Delta t$ is a time duration from an initial time to the collision,
R is a predetermined reaction time; and
wherein the collision is indicated where a $\Delta t$ exists for which both inequalities are satisfied.

10. The system of claim 8, wherein the predetermined set of conditions comprises relationships among the host and target vehicle separations, speeds and geometries.

11. The system of claim 10, wherein the relationships among the host and target vehicle separations, speeds and geometries comprise the following inequalities:

$$D_0 - \Delta t(V_{1l} - V_{2l}) < \frac{(W_1 + W_2)}{2} \times C,$$

and $$S_0 + \Delta t(V_{1f} - V_{2f}) < \frac{(L_1 + L_2)}{2} \times C,$$

wherein $D_0$ is an initial lateral separation between the host and target vehicles,
$V_{1l}$ is the host vehicle lateral speed,
$V_{2l}$ is the target vehicle lateral speed,
$W_1$ is a width of the host vehicle,
$W_2$ is a width of the target vehicle,
$S_0$ is an initial longitudinal separation between the host and target vehicles,
$V_{1f}$ is the host vehicle longitudinal speed,
$V_{2f}$ is the target vehicle longitudinal speed,
$L_1$ is a length of the host vehicle,
$L_2$ is a length of the target vehicle,
$\Delta t$ is a time duration from an initial time to the collision,
C is a predetermined coefficient determining a minimum margin distance; and
wherein the collision is indicated where a $\Delta t$ exists for which both inequalities are satisfied.

12. The system of claim 8, wherein the predetermined set of conditions comprises relationships among the host and target vehicle separations, speeds and geometries, and lane geometries.

13. The system of claim 12, wherein the relationships among the host and target vehicle separations, speeds and geometries, and lane geometries comprise the following inequalities:

$$(V_{1l} + V_{2l})\Delta t \geq D_0 - \frac{W_1\cos\alpha + W_2\cos\beta}{2},$$

$$(V_{1f} - V_{2f})\Delta t \leq \frac{L_1\sin\alpha + L_2\sin\beta}{2} - S_0,$$

$$D_{1L} < V_{1l}\Delta t < D_{1L} + W_L,$$

and $$D_{2L} < V_{2l}\Delta t < D_{2L} + W_L,$$

wherein $D_0$ is an initial lateral separation between the host and target vehicles,
$V_{1l}$ is the host vehicle lateral speed,
$V_{2l}$ is the target vehicle lateral speed,
$W_1$ is a width of the host vehicle,
$W_2$ is a width of the target vehicle,
α and β represent angles between respective vehicle headings and the roadway centerline,
$S_0$ is an initial longitudinal separation between the host and target vehicles,
$V_{1f}$ is the host vehicle longitudinal speed,
$V_{2f}$ is the target vehicle longitudinal speed,
$L_1$ is a length of the host vehicle,
$L_2$ is a length of the target vehicle,
$D_{1L}$ is a longitudinal separation between the host vehicle and the adjacent intermediate lane,
$D_{2L}$ is a longitudinal separation between the target vehicle and the adjacent intermediate lane,
$W_L$ is lane width,
$\Delta t$ is a time duration from an initial time to the collision; and
wherein a collision is indicated where a $\Delta t$ exists for which all inequalities are satisfied.

14. The system of claim 8, comprising:
at least one of a radar system, a lidar system, an ultrasonic system, a vision system, a global positioning system, a vehicle-to-vehicle communication system, and a vehicle-to-infrastructure communication system providing at least one of target vehicle position data, range data and rate data;
wherein the controller configured to determine the host and target vehicles are converging is based upon at least one of the target vehicle position data, range data and rate data.

15. A method for predicting a collision between a host vehicle and a target vehicle operating on a multi-lane roadway, comprising:
determining the host and target vehicles are converging from respective first and second lanes to a third lane intermediate the first and second lanes, comprising:
determining a change in a lateral separation between the host and target vehicles over a known time;
determining a lateral closing speed between the host and target vehicles based upon the change in the lateral separation and the known time; and
determining the host and target vehicles are converging when the lateral closing speed exceeds a known lateral speed of the host vehicle;
evaluating a predetermined set of inequalities comprising host and target vehicle separations and speeds; and
predicting the collision based upon the evaluating;
notifying a control system of the predicted collision; and
controlling intervention of one or more of chassis, steering, braking, or transmission systems functions with the control system.

16. The method of claim 15, wherein the predetermined set of inequalities comprises the following inequalities:

$$D_0 - \Delta t(V_{1l} - V_{2l}) < (V_{1l} - V_{2l}) \times R, \text{ and}$$

$$S_0 + \Delta t(V_{1f} - V_{2f}) < (V_{1f} - V_{2f}) \times R,$$

wherein $D_0$ is an initial lateral separation between the host and target vehicles,
$V_{1l}$ is the host vehicle lateral speed,
$V_{2l}$ is the target vehicle lateral speed,
$S_0$ is an initial longitudinal separation between the host and target vehicles,
$V_{1f}$ is the host vehicle longitudinal speed,
$V_{2f}$ is the target vehicle longitudinal speed,
$\Delta t$ is a time duration from an initial time to the predicted collision,
R is a predetermined reaction time; and
wherein the predicted collision is indicated where a $\Delta t$ exists for which both inequalities are satisfied.

\* \* \* \* \*